US008852811B2

(12) United States Patent
Koga et al.

(10) Patent No.: US 8,852,811 B2
(45) Date of Patent: Oct. 7, 2014

(54) PROCESS FOR PRODUCING LITHIUM MANGANATE PARTICLES AND NON-AQUEOUS ELECTROLYTE SECONDARY BATTERY (75) Inventors: Kazumichi Koga, Yamaguchi-ken (JP); Masayuki Uegami, Yamaguchi-ken (JP); Hiroaki Masukuni, Yamaguchi-ken (JP); Kazutoshi Matsumoto, Yamaguchi-ken (JP)

(73) Assignee: Toda Kogyo Corporation, Otake-shi, Hiroshima-ken (JP)

( * ) Notice: Subject to any disclaimer, the term of this patent is extended or adjusted under 35 U.S.C. 154(b) by 437 days.

(21) Appl. No.: 13/063,812

(22) PCT Filed: Sep. 16, 2009

(86) PCT No.: PCT/JP2009/004636
§ 371 (c)(1),
(2), (4) Date: May 10, 2011

(87) PCT Pub. No.: WO2010/032449
PCT Pub. Date: Mar. 25, 2010

(65) Prior Publication Data
US 2011/0210287 A1 Sep. 1, 2011

(30) Foreign Application Priority Data
Sep. 18, 2008 (JP) ................. 2008-239967

(51) Int. Cl.
*H01M 4/505* (2010.01)
*C04B 35/628* (2006.01)
(Continued)

(52) U.S. Cl.
CPC ..... *H01M 10/052* (2013.01); *C04B 2235/5463* (2013.01); *C04B 35/62813* (2013.01);
(Continued)

(58) Field of Classification Search
USPC ............... 252/518.1, 182.1; 423/220, 594.15, 423/599; 429/224, 231.95
See application file for complete search history.

(56) References Cited

U.S. PATENT DOCUMENTS 6,699,618 B2   3/2004  Noda et al.
6,890,456 B2   5/2005  Noda et al.
(Continued)

FOREIGN PATENT DOCUMENTS

EP   1 372 202 A1   12/2003
EP   2 416 409 A1    2/2012
(Continued)

OTHER PUBLICATIONS

International Preliminary Report on Patentability (English version) in PCT/JP2009/004636 dated Apr. 28, 2011.
(Continued)

*Primary Examiner* — Mark Kopec
*Assistant Examiner* — Haidung Nguyen
(74) *Attorney, Agent, or Firm* — Nixon & Vanderhye, P.C.

(57) ABSTRACT

According to the present invention, there is provided a process for producing lithium manganate particles having a high output and an excellent high-temperature stability. The present invention relates to a process for producing lithium manganate particles comprising the steps of mixing a lithium compound, a manganese compound and a boron compound with each other; and calcining the resulting mixture in a temperature range of 800 to 1050° C., wherein an average particle diameter ($D_{50}$) of the boron compound is not more than 15 times an average particle diameter ($D_{50}$) of the manganese compound, and wherein the lithium manganate particles have a composition represented by the following chemical formula:

$Li_{1+x}Mn_{2-x-y}Y1_yO_4+B$ in which Y1 is at least one element selected from the group consisting of Ni, Co, Mg, Fe, Al, Cr and Ti, and x and y satisfy the conditions of $0.03 \leq x \leq 0.15$ and $0 \leq y \leq 0.20$, respectively.

4 Claims, 4 Drawing Sheets (51) Int. Cl.
*C01G 45/02* (2006.01)
*C04B 35/626* (2006.01)
*C04B 35/01* (2006.01)
*H01M 4/485* (2010.01)
*H01M 10/052* (2010.01)
*C01G 45/12* (2006.01)
*H01M 4/525* (2010.01)
*H01M 4/131* (2010.01)

(52) U.S. Cl.
CPC ......... *C01G 45/02* (2013.01); *C04B 2235/3275* (2013.01); *H01M 4/525* (2013.01); *H01M 4/505* (2013.01); *C04B 2235/5481* (2013.01); *C04B 2235/81* (2013.01); *C04B 35/62675* (2013.01); *C04B 35/62886* (2013.01); *C04B 2235/3203* (2013.01); *C04B 2235/3409* (2013.01); *C04B 35/62805* (2013.01); *C04B 2235/3206* (2013.01); *C04B 2235/3232* (2013.01); *C01P 2004/51* (2013.01); *C01P 2006/12* (2013.01); *C04B 35/016* (2013.01); *C04B 2235/3241* (2013.01); *C04B 2235/5436* (2013.01); *H01M 4/485* (2013.01); *C04B 2235/442* (2013.01); *Y02E 60/122* (2013.01); *C04B 2235/3217* (2013.01); *H01M 4/131* (2013.01); *C04B 2235/3263* (2013.01); *C01P 2004/61* (2013.01); *C01P 2004/03* (2013.01); *C04B 2235/3267* (2013.01); *C04B 35/62802* (2013.01); *C04B 2235/3272* (2013.01); *C01P 2006/40* (2013.01); *C04B 2235/3279* (2013.01); *C01G 45/1235* (2013.01); *C04B 2235/528* (2013.01)

USPC .................. 429/231.95; 429/224; 252/182.1; 252/518.1; 423/594.15; 423/599

(56) References Cited

U.S. PATENT DOCUMENTS

| | | |
|---|---|---|
| 7,090,822 B2 | 8/2006 | Noda et al. |
| 2004/0013941 A1 | 1/2004 | Kobayashi et al. |
| 2005/0123832 A1 | 6/2005 | Tsukuma et al. |
| 2009/0050841 A1 | 2/2009 | Sasaki et al. |
| 2011/0287319 A1 | 11/2011 | Vogler et al. |
| 2012/0012776 A1 | 1/2012 | Kagei et al. |

FOREIGN PATENT DOCUMENTS

| | | |
|---|---|---|
| JP | 2001-185146 | 7/2001 |
| WO | WO 2009/156119 A1 | 12/2009 |
| WO | WO 2010/114015 A1 | 10/2010 |

OTHER PUBLICATIONS

International Search Report for PCT/JP2009/004636, mailed Oct. 27, 2009.
Supplementary European Search Report dated Jun. 28, 2013 of corresponding European Patent Application No. 09814294.6-1355 / 2330079, PCT/JP2009004636 (7 pgs).

PROCESS FOR PRODUCING LITHIUM MANGANATE PARTICLES AND NON-AQUEOUS ELECTROLYTE SECONDARY BATTERY

This application is the U.S. national phase of International Application No. PCT/JP2009/004636 filed 16 Sep. 2009, which designated the U.S. and claims priority to JP Application No. 2008-239967 filed 18 Sep. 2008, the entire contents of each of which are hereby incorporated by reference.

TECHNICAL FIELD

The present invention relates to lithium manganate particles which are capable of exhibiting a high output and an excellent high-temperature stability.

BACKGROUND ART

With the recent rapid development of portable and cordless electronic devices such as audio-visual (AV) devices and personal computers, there is an increasing demand for secondary batteries or batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode active substances useful for high energy-type lithium ion secondary batteries exhibiting a 4 V-grade voltage, there are generally known $LiMn_2O_4$ having a spinel structure, and $LiMnO_2$, $LiCoO_2$, $LiCo_{1-x}Ni_xO_2$ and $LiNiO_2$ having a rock-salt type structure, or the like. Among these active substances, $LiCoO_2$ is more excellent because of a high voltage and a high capacity thereof, but has the problems such as a high production cost due to a less amount of a cobalt raw material supplied, and a poor environmental safety upon disposal of batteries obtained therefrom. In consequence, there have now been made earnest studies on lithium manganate particles having a spinel type structure (basic composition: $LiMn_2O_4$; this is hereinafter defined in the same way) which are produced by using, as a raw material, manganese having a large supply amount, a low cost and a good environmental compatibility.

As is known in the art, the lithium manganate particles may be obtained by mixing a manganese compound and a lithium compound at a predetermined ratio and then calcining the resulting mixture at a temperature of 700 to 1000° C.

When using the lithium manganate particles as a positive electrode active substance for lithium ion secondary batteries, the resulting battery has a high voltage and a high energy density, but tends to be deteriorated in charge/discharge cycle characteristics. The reason therefor is considered to be that when charge/discharge cycles are repeated, the crystal lattice is expanded and contracted owing to desorption and insertion behavior of lithium ions in the crystal structure to cause change in volume of the crystal, which results in occurrence of breakage of the crystal lattice or dissolution of manganese in an electrolyte solution.

At present, in the lithium ion secondary batteries using lithium manganate particles, it has been strongly required to suppress deterioration in charge/discharge capacity due to repeated charge/discharge cycles, and improve the charge/discharge cycle characteristics, in particular, under high-temperature and low-temperature conditions.

In order to improve the charge/discharge cycle characteristics of the batteries, it is required that the positive electrode active substance used therein which comprises the lithium manganate particles has an excellent packing property and an appropriate particle size, and further is free from elution of manganese therefrom. To meet the requirements, there have been proposed the method of suitably controlling a particle size and a particle size distribution of the lithium manganate particles; the method of obtaining the lithium manganate particles having a high crystallinity by controlling a calcination temperature thereof; the method of adding different kinds of elements to the lithium manganate particles to strengthen a bonding force of the crystals; the method of subjecting the lithium manganate particles to surface treatment or adding additives thereto to suppress elution of manganese therefrom; or the like.

Conventionally, it is known that aluminum as one of the different kinds of elements is incorporated in the lithium manganate particles (Patent Documents 1 to 6). In addition, it is known that a boron source such as boron oxide, boric acid, lithium borate and ammonium borate is added to the lithium manganate particles upon calcination of the particles to attain a sintering aid effect by addition thereof (Patent Documents 7 to 11).

More specifically, in the conventional arts, there are respectively described the method of incorporating a Ca compound and/or an Ni compound as well as an Al compound into lithium manganate particles (Patent Document 1); the method of incorporating Al into lithium manganate particles in which positions of peaks of respective diffraction planes as observed in X-ray diffraction analysis thereof are defined (Patent Document 2); the method of incorporating a different kind of element such as Al into lithium manganate particles and conducting the calcination of the lithium manganate particles at multiple stages (Patent Document 3); lithium manganate which is obtained by incorporating Al into lithium manganate particles, and has a specific surface area of 0.5 to 0.8 $m^2$/g and a sodium content of not more than 1000 ppm (Patent Document 4); lithium manganate which is obtained by incorporating a different kind of element such as Al into lithium manganate particles, and has a half value width of (400) plane of not more than 0.22° and comprises crystal particles having an average particle diameter of not more than 2 μm (Patent Document 5); lithium manganate which is obtained by incorporating a different kind of element such as Al into lithium manganate particles, and has a crystallite size of not less than 600 Å and a lattice distortion of not more than 0.1% (Patent Document 6); lithium manganate which is obtained by heat-treating a lithium compound, manganese dioxide and a boron compound at a temperature of 600 to 800° C. and which is represented by a specific chemical formula from which it is suggested that boron is incorporated into a lattice thereof (Patent Document 7); lithium manganate particles into which an element whose oxide has a melting point of not higher than 800° C. and a fluorine compound are incorporated and further which is represented by a specific chemical formula from which it is suggested that these elements are incorporated into a lattice thereof (Patent Document 8); lithium manganate particles comprising a small amount of boron (Patent Document 9); and lithium manganate particles comprising lithium tetraborate which is used and defined as a boric acid species (Patent Document 10).

Patent Document 1: Japanese Patent Application Laid-Open (KOAKI) No. 2000-294237
Patent Document 2: Japanese Patent Application Laid-Open (KOAKI) No. 2001-146425
Patent Document 3: Japanese Patent Application Laid-Open (KOAKI) No. 2001-328814

Patent Document 4: Japanese Patent Application Laid-Open (KOAKI) No. 2002-33099

Patent Document 5: Japanese Patent Application Laid-Open (KOAKI) No. 2002-316823

Patent Document 6: Japanese Patent Application Laid-Open (KOAKI) No. 2006-252940

Patent Document 7: Japanese Patent Application Laid-Open (KOAKI) No. 8-195200

Patent Document 8: Japanese Patent Application Laid-Open (KOAKI) No. 2001-48547

Patent Document 9: Japanese Patent Application Laid-Open (KOAKI) No. 2002-42812

Patent Document 10: Japanese Patent Application Laid-Open (KOAKI) No. 2005-112710

DISCLOSURE OF THE INVENTION

Problem to be Solved by the Invention

At present, it has been strongly required to provide lithium manganate as a positive electrode active substance for a non-aqueous electrolyte secondary battery which is improved in output characteristics and high-temperature characteristics. However, the lithium manganate capable of fully satisfying these requirements as well as the production process thereof have not been obtained until now.

That is, in the above Patent Documents 1 to 10, there are respectively described the lithium manganates in which a part of manganese as one of metal elements is substituted with a different kind of element, or the lithium manganates into which a small amount of a boron compound is incorporated. However, these lithium manganates have failed to provide batteries capable of exhibiting satisfactory high-temperature storage characteristics and, therefore, tend to be insufficient upon practical use.

As a result of the present inventors' earnest study concerning a shape of the elements to be added to the lithium manganate, a calcination temperature, etc., the present invention has been attained.

Means for Solving the Problem

The above problems and technical tasks can be solved and accomplished by the following aspects of the present invention.

That is, according to the present invention, there are provided a process for producing lithium manganate particles comprising the steps of:

mixing a lithium compound, a manganese compound and a boron compound with each other; and calcining the resulting mixture in a temperature range of 800 to 1050° C., in which an average particle diameter ($D_{50}$) of the boron compound is not more than 15 times an average particle diameter ($D_{50}$) of the manganese compound (Invention 1).

Also, according to the present invention, there is provided the process for producing lithium manganate particles as described in the above Invention 1, wherein the average particle diameter ($D_{50}$) of the boron compound is 1 μm to 100 μm (Invention 2).

Also, according to the present invention, there is provided the process for producing lithium manganate particles as described in the above Invention 1 or 2, wherein the average particle diameter ($D_{50}$) of the manganese compound is 1 μm to 20 μm (Invention 3).

Also, according to the present invention, there is provided the process for producing lithium manganate particles as described in any one of the above Inventions 1 to 3, wherein the lithium manganate particles as produced comprise secondary particles formed by aggregating or sintering primary particles of the lithium manganate particles having a particle diameter of not less than 1 μm, and have a composition represented by the following chemical formula:

$Li_{1+x}Mn_{2-x-y}Y1_yO_4+B$ where Y1 is at least one element selected from the group consisting of Ni, Co, Mg, Fe, Al, Cr and Ti, and x and y satisfy the conditions of 0.03≤x≤0.15 and 0≤y≤0.20, respectively; and wherein the secondary particles of the lithium manganate particles have an average particle diameter ($D_{50}$) of 1 μm to 20 μm, and a breadth ($D_{90}$–$D_{10}$) of particle size distribution of 2 μm to 40 μm (Invention 4).

In addition, according to the present invention, there is provided a non-aqueous electrolyte secondary battery comprising as a positive electrode active substance or a part thereof, the lithium manganate particles produced by the process for producing lithium manganate particles as defined in any one of the above Inventions 1 to 4 (Invention 5).

Effect of the Invention

The lithium manganate particles produced according to the present invention exhibit a high output and are excellent especially in high-temperature stability, and, therefore, can be suitably used as a positive electrode active substance (cathode active material) for a non-aqueous electrolyte secondary battery.

That is, when the manganese compound, the lithium compound, the finely divided boron compound and, if required, an additional compound of a different kind of element, are mixed with each other at a predetermined mixing ratio, and the resulting mixture is calcined at a predetermined temperature, it is possible to obtain lithium manganate particles having excellent properties.

PREFERRED EMBODIMENTS FOR CARRYING OUT THE INVENTION

The present invention is described in more detail below.

First, the process for producing the lithium manganate particles according to the present invention is described.

In accordance with the present invention, in the process for producing the lithium manganate particles by mixing a lithium compound, a manganese compound and a boron compound with each other and calcining the resulting mixture at a temperature of 800 to 1050° C., the average particle diameter ($D_{50}$) of secondary particles of the boron compound added is not more than 15 times the average particle diameter ($D_{50}$) of secondary particles of the manganese compound.

When the average particle diameter ($D_{50}$) of secondary particles of the boron compound is more than 15 times the average particle diameter ($D_{50}$) of secondary particles of the manganese compound, a large amount of fine lithium manganate particles tend to be generated, so that the battery characteristics tend to be deteriorated. In addition, considerable segregation of fused boron tends to occur upon the calcination, and the extent of aggregation of lithium manganate tends to be non-uniform, so that the resulting particles tend to include portions where they are likely to undergo cohesive failure. The average particle diameter ($D_{50}$) of secondary particles of the boron compound is preferably not less than 2 times and not more than 14 times, and more preferably not less than 3 times and not more than 13 times the average particle diameter ($D_{50}$) of secondary particles of the manganese compound.

The average particle diameter ($D_{50}$) of secondary particles of the boron compound used in the present invention is preferably 1 to 100 µm and more preferably 1 to 70 µm.

The average particle diameter ($D_{50}$) of secondary particles of the manganese compound used in the present invention is preferably 1.0 to 20 µm and more preferably 2.0 to 19 µm.

Examples of the manganese particles used in the present invention include trimanganese tetraoxide ($Mn_3O_4$) and manganese dioxide ($MnO_2$). Among these manganese compounds, trimanganese tetraoxide is preferably used.

Examples of the boron compound used in the present invention include boric acid, lithium tetraborate, boron oxide and ammonium borate. Among these boron compounds, the use of boric acid is especially preferred.

Examples of the lithium compound used in the present invention include lithium carbonate and lithium hydroxide. Among these lithium compounds, the use of lithium carbonate is especially preferred.

Meanwhile, in the case where at least one different kind of element selected from the group consisting of Ni, Co, Mg, Fe, Al, Cr and Ti is allowed to be present in the lithium manganate particles according to requirements, there may be used either the method of mixing the lithium compound, the manganese compound, a compound of the different kind of metal element and the boron compound with each other and calcining the resulting mixture, or the method of forming a composite material of the manganese compound and the different kind of metal element (by coating the surface of the manganese compound with the compound of the different kind of metal element by a dry or wet method, by precipitating the compound of the different kind of metal element on the surface of the manganese compound, etc.), and then mixing the composite material with the lithium compound and the boron compound and calcining the resulting mixture.

The mixing ratio of the manganese compound and the lithium compound is preferably controlled such that the molar ratio of Li to Mn (Li/Mn) is about 0.525 to about 0.62. When the molar ratio Li/Mn is less than 0.525, the resulting lithium manganate particles exhibit a high capacity, but tend to be deteriorated in charge/discharge cycle characteristics owing to occurrence of distortion by Jahn-Teller effects. When the molar ratio Li/Mn is more than 0.62, the resulting lithium manganate particles tend to have an insufficient initial capacity. The molar ratio Li/Mn is more preferably 0.530 to 0.610.

Upon the calcination, the boron compound serves as a sintering aid for promoting a crystal growth of the lithium manganate particles. The boron compound is added in such an amount that boron is present in an amount of 0.1 to 2.5 mol % based on manganese. When the amount of boron based on manganese is less than 0.1 mol %, a sufficient sintering promotion effect by addition of the boron compound tends to be hardly attained. When the amount of boron based on manganese is more than 2.5 mol %, the sintering promotion effect tends to be already saturated and, therefore, addition of such a large amount of the boron compound tends to be unnecessary. In addition, the resulting lithium manganate particles tend to be excessively aggregated and sintered, resulting in undesirable generation of fine particles thereof. The boron compound is preferably added in such an amount that boron is present in an amount of 0.3 to 2.0 mol % based on manganese.

In the present invention, the calcination temperature is preferably not lower than 800° C. When the calcination temperature is lower than 800° C., a sufficient sintering promotion effect on the particles by addition of boron tends to be hardly attained. The calcination temperature is more preferably 850 to 1050° C.

The calcination atmosphere may be an oxygen-containing gas, for example, the calcination may be carried out in air. The calcination time may be appropriately selected such that the calcination reaction proceeds uniformly, and is preferably 1 to 48 hr and more preferably 10 to 24 hr.

Further, the boron compound has such an effect that edges of the lithium manganate particles (angular edged portions; connecting sites between crystal planes) are dulled to form rounded particles. It is considered that the conventional lithium manganate particles are deteriorated in battery characteristics, in particular, under a high-temperature condition owing to elution of manganese from the angular edged portions thereof. In the present invention, since the edges (angular edged portions) of the lithium manganate particles are dulled to form rounded particles, it is possible to reduce the number of sites from which manganese is eluted out. As a result, it is considered that the secondary battery produced using the lithium manganate particles can exhibit an enhanced stability.

In addition, it is also considered that the boron compound is reacted with lithium contained in the lithium compound upon the calcination to form a B—Li-based compound.

It is considered that the thus formed B—Li-based compound is melted at a temperature of not lower than 800° C., so that the respective lithium manganate particles are therefore coated with the B—Li-based compound thus melted. In addition, when the lithium manganate particles are measured by a powder X-ray diffractometer (XRD), no crystal phase comprising boron can be detected. Therefore, it is considered that the B—Li-based compound is present in an amorphous state. Thus, it is considered that the B—Li-based compound has a function as a kind of protective film, so that the obtained coated particles can be prevented from undergoing elution of manganese therefrom, in particular, under a high temperature condition.

When the average particle diameter of the boron compound is larger than the range specified in the present invention, it is considered that the B—Li-based compound produced in an excessive amount upon the calcination strengthens bonding with oxygen. When the thickness of the B—Li-based compound film is too large (i.e., when the amount of the boron compound added is too large), it is considered that oxygen to be incorporated upon the calcination is prevented from being diffused in a lattice of the lithium manganate. As a result, it is considered that a necessary amount of oxygen is hardly completely incorporated into the lattice, so that the resulting lithium manganate particles tend to lie in a state of oxygen deficiency and distortion of a spinel structure of the particles tends to be readily caused. In the distorted lattice, the amount of oxygen capable of constraining manganese is deficient. As a result, it is considered that the lithium manganate particles tend to readily suffer from elution of manganese therefrom.

In the present invention, the boron compound having a reduced particle diameter according to the present invention is allowed to be locally present on the surface of the respective lithium manganate particles, and the thickness of the B—Li-based compound coating film formed on the respective particles can be reduced. As a result, it is considered that the obtained lithium manganate particles hardly suffer from oxygen deficiency and can be therefore prevented from causing elution of manganese therefrom. Also, in the present invention, the boron compound is more preferably distributed over the surface of the respective lithium manganate particles.

Next, the lithium manganate particles obtained by the process for producing lithium manganate particles according to the present invention are described.

The lithium manganate particles according to the present invention have a composition represented by the following chemical formula:

$$Li_{1+x}Mn_{2-x-y}Y1_yO_4+B$$

in which Y1 is preferably at least one element selected from the group consisting of Ni, Co, Mg, Fe, Al, Cr and Ti.

In the above chemical formula, x is preferably 0.03 to 0.15, and y is preferably 0 to 0.20.

When x is less than 0.03, the resulting particles have a high capacity, but tends to be considerably deteriorated in high-temperature characteristics. When x is more than 0.15, the resulting particles are improved in high-temperature characteristics, but tend to be considerably deteriorated in capacity or tend to cause increase in resistance owing to formation of Li-rich phase therein. The value of x is preferably 0.05 to 0.15.

When y is more than 0.20, the resulting particles tend to suffer from significant decrease in capacity and, therefore, tend to be unpractical. The value of y is preferably 0.01 to 0.20 and more preferably 0.05 to 0.15.

It is considered that boron forms a B—Li-based compound with which the respective lithium manganate particles are coated. Further, it is considered that boron is not incorporated into a lattice of lithium manganate, and the B—Li-based compound is present in an amorphous state in the vicinity of the surface of the respective particles. The B—Li-based compound is considered to serve as a kind of protective film to thereby prevent elution of manganese therefrom, in particular, under a high temperature condition. When a boron element is present inside of the respective lithium manganate particles, a secondary battery produced using the lithium manganate particles tends to be deteriorated in stability.

The content of boron in the lithium manganate particles is 0.1 to 2.5 mol % based on manganese. When the content of boron is less than 0.1 mol %, the respective lithium manganate particles may fail to be coated with the B—Li-based compound to a sufficient extent, so that the effect of preventing elution of manganese therefrom tends to be hardly attained. When the content of boron is more than 2.5 mol %, fine lithium manganate particles tend to be generated, so that battery characteristics thereof tend to be deteriorated. The content of boron in the lithium manganate particles is preferably 0.3 to 2.0 mol % based on manganese.

The average particle diameter ($D_{50}$) of secondary particles of the lithium manganate particles according to the present invention is preferably 1 to 20 μm. When the average particle diameter ($D_{50}$) of secondary particles of the lithium manganate particles is less than 1 μm, the lithium manganate particles tend to be deteriorated in stability. When the average particle diameter ($D_{50}$) of secondary particles of the lithium manganate particles is more than 20 μm, the resulting battery produced using the lithium manganate particles tends to be deteriorated in output. The average particle diameter ($D_{50}$) of secondary particles of the lithium manganate particles is more preferably 2 to 15 μm and still more preferably 3 to 10 μm.

The breadth of particle size distribution ($D_{90}$–$D_{10}$) of secondary particles of the lithium manganate particles according to the present invention is preferably 2 to 30 μm. When the breadth of particle size distribution ($D_{90}$–$D_{10}$) is more than the above-specified range, the lithium manganate particles tend to have an undesirably broad particle size distribution. The breadth of particle size distribution ($D_{90}$–$D_{10}$) of secondary particles of the lithium manganate particles is more preferably 3 to 20 μm.

When the size of the boron compound added in the present invention is too large, the boron compound may fail to be uniformly attached to the manganese compound upon the calcination, so that bonding between the lithium manganate secondary particles tends to be locally increased, or the breadth ($D_{90}$–$D_n$) tends to become large owing to generation of fine particles.

When producing the lithium manganate particles according to the production process of the present invention, generation of the fine particles can be prevented, and bonding between secondary particles thereof can be suppressed, so that the breadth of particle size distribution ($D_{90}$–$D_{10}$) thereof can be narrowed.

In addition, the average particle diameter of primary particles constituting the lithium manganate particles according to the present invention is not less than 1 μm. When the average primary particle diameter is less than 1 μm, the lithium manganate particles tend to be deteriorated in stability. When the average primary particle diameter is more than 15 μm, the secondary battery produced using the lithium manganate particles tends to be deteriorated in output. The average particle diameter of primary particles constituting the lithium manganate particles is preferably 1.2 to 13.0 μm.

Next, a positive electrode using the positive electrode active substance comprising the lithium manganate particles for a non-aqueous electrolyte secondary battery according to the present invention is described.

When producing the positive electrode using the positive electrode active substance according to the present invention, a conducting agent and a binder are added to and mixed with the positive electrode active substance by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance according to the present invention comprises the above positive electrode, a negative electrode and an electrolyte.

Examples of a negative electrode active substance which may be used in the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate and lithium borate tetrafluoride in the above solvent.

<Function>

The important point of the present invention resides in that the average particle diameter ($D_{50}$) of the boron compound is not more than 15 times the average particle diameter ($D_{50}$) of the manganese compound.

In the present invention, when the average particle diameter ($D_{50}$) of the boron compound is adjusted to be not more than 15 times the average particle diameter ($D_{50}$) of the manganese compound, the sintering aid effect of the boron compound is uniformly exerted over whole portions of the manganese compound particles, and the respective lithium manganate particles are coated with a thin film of the B—Li-based compound produced during the calcination step. As a result, it is possible to promote strong sintering between the particles even when the boron compound is added in a small amount.

Also, addition of a large amount of the boron compound tends to cause generation of a large amount of fine particles upon pulverization after the calcination. However, according to the present invention, by reducing the particle diameter of the boron compound added, a sufficient effect of promoting sintering between the particles can be attained even when the boron compound is added in a small amount. As a result, it is possible to suppress generation of the fine particles upon the pulverization.

In addition, when the average particle diameter ($D_{50}$) of the boron compound is adjusted to be not more than 15 times the average particle diameter ($D_{50}$) of the manganese compound, the lithium compound, the manganese compound and the boron compound are readily uniformly mixed with each other, and a uniform thin film of the B—Li-based compound is formed on the respective lithium manganate particles upon the calcination of the lithium manganate particles. Since the thus formed film of the B—Li-based compound is very thin, oxygen tends to be readily absorbed therethrough into the particles. As a result, it is possible to produce the lithium manganate particles which hardly suffer from oxygen deficiency.

EXAMPLES

Typical examples of the present invention are described in more detail below.

The average particle diameter ($D_{50}$) of each of the manganese compound and the lithium manganate is a volume median particle diameter as measured by a wet laser method using a laser type particle size distribution measuring apparatus "MICROTRACK HRA" manufactured by Nikkiso Co., Ltd., whereas the average particle diameter ($D_{50}$) of the boron compound is a volume median particle diameter as measured by a dry laser method using a particle size distribution measuring apparatus "HELOS" manufactured by Sympatec GmbH.

The average particle diameter ($D_{50}$) means the particle size at which a cumulative volume ratio of the lithium manganate particles as calculated with respect to their particle sizes is 50% assuming that a total volume of the lithium manganate particles is 100%. Also, ($D_{10}$) is defined by the particle size at which a cumulative volume ratio of the lithium manganate particles as calculated with respect to their particle sizes is 10% assuming that a total volume of the lithium manganate particles is 100%, whereas ($D_{90}$) is defined by the particle size at which a cumulative volume ratio of the lithium manganate particles as calculated with respect to their particle sizes is 90% assuming that a total volume of the lithium manganate particles is 100%.

The breadth of particle size distribution ($D_{90}$–$D_{10}$) is the value obtained by subtracting the above $D_{10}$ from the above $D_{90}$.

The average particle diameter of primary particles of the lithium manganate particles was determined by calculating an average value of particle diameters of the lithium manganate primary particles which were read out from an SEM image thereof.

The coin cell produced by using the lithium manganate particles was evaluated for initial charge/discharge characteristics and high-temperature storage characteristics.

First, 92% by weight of the lithium manganate particles as a positive electrode active substance, 2.5% by weight of acetylene black and 2.5% by weight of a graphite "KS-15" both serving as a conducting material, and 3% by weight of polyvinylidene fluoride dissolved in N-methyl pyrrolidone as a binder, were mixed with each other, and then the resulting mixture was applied onto an Al metal foil and then dried at 120° C. The thus obtained sheets were each blanked into 160 mmφ and then compression-bonded together under a pressure of 1.5 t/cm$^2$, thereby producing an electrode having a thickness of 50 μm and using the thus produced electrode as a positive electrode. A metallic lithium blanked into 160 mmφ was used as a negative electrode, and a solution prepared by mixing EC and DEC in which 1 mol/L of LiPF$_6$ was dissolved, with each other at a volume ratio of 3:7 was used as an electrolyte solution, thereby producing a coin cell of a CR2032 type.

The initial charge/discharge characteristics of the battery were determined as follows. That is, under a room temperature condition, the battery was charged at a current density of 0.1 C until reaching 4.3 V to subject the battery to constant potential charge for 90 min, and then discharged at a current density of 0.1 C until reaching 3.0 V, to thereby measure an initial charge capacity, an initial discharge capacity and an initial efficiency of the battery.

In order to determine high temperature characteristics of the battery, the following high-temperature cycle test was carried out. That is, the cycle test was carried out in a constant temperature oven held at 60° C. in a voltage range of 3.0 to 4.3 V in which at the 1st, 11th, 21st and 31st cycles, the battery was charged and discharged at a C rate of 0.1 C, whereas at the other cycles, the battery was charged and discharged at a C rate of 1 C. The "high-temperature cycle capacity retention rate" of the battery was determined by a ratio of the 31st cycle discharge capacity to an initial discharge capacity thereof. The "rate characteristic" of the battery was determined by a ratio of the 30th cycle value to the 31st cycle value (30th cycle value/31st cycle value×100).

The "oxygen deficiency" was determined by measuring a specific capacity of the battery in the range of 3.3 V to 3.0 V when discharged at a rate of 0.1 C (3.3 V Foot). When the oxygen deficiency is caused, a plateau region is observed in the range of 3.3 V to 3.0 V upon the discharge. It is considered that when the specific capacity reaches, in particular, 1.0 mAh/g or more, the oxygen deficiency is large, and elution of a large amount of manganese is likely to occur.

Example 1

Under a nitrogen flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the resulting product was washed with water and then dried, thereby obtaining manganese oxide particles.

The thus obtained manganese oxide particles were $Mn_3O_4$ and had a granular shape and an average particle diameter of 4.8 μm.

The resulting water suspension comprising the manganese oxide particles was washed with water in an amount of 5 times the amount of the water suspension using a filter press, and then subjected to deaggregation to adjust a concentration of the manganese oxide particles in the water suspension to 10% by weight. A 0.2 mol/L sodium aluminate aqueous solution was continuously fed to the suspension in a reaction vessel such that a molar ratio of Mn:Al in the resulting mixture was 95:5. The contents of the reaction vessel were always kept stirred by a stirrer and, at the same time, a 0.2 mol/L sulfuric acid aqueous solution was automatically supplied thereto so as to control the pH value of the reaction solution in the reaction vessel to 8±0.5, thereby obtaining a suspension comprising the manganese oxide particles whose surface was coated with aluminum hydroxide.

The resulting suspension was washed with water in an amount of 10 times the weight of the manganese oxide particles in the suspension using a filter press, and then dried, thereby obtaining the manganese oxide particles whose surface was coated with aluminum hydroxide and which had a molar ratio of Mn:Al of 95:5 and an average secondary particle diameter of 4.8 μm.

Figure 1:
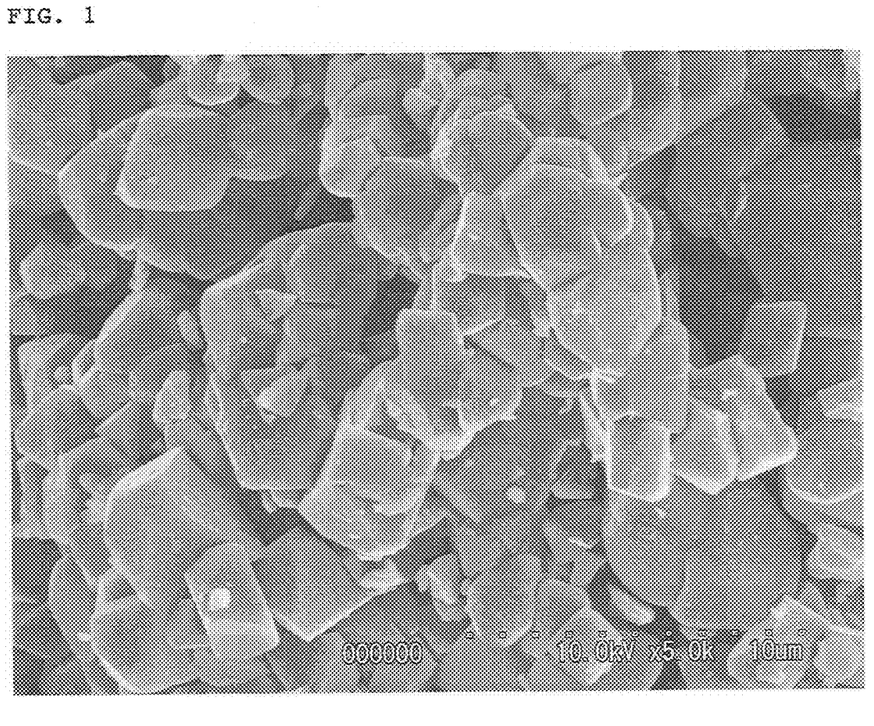
FIG. 1 is an SEM image of lithium manganate particles obtained in Example 1 (magnification: ×5000).
Figure 2:
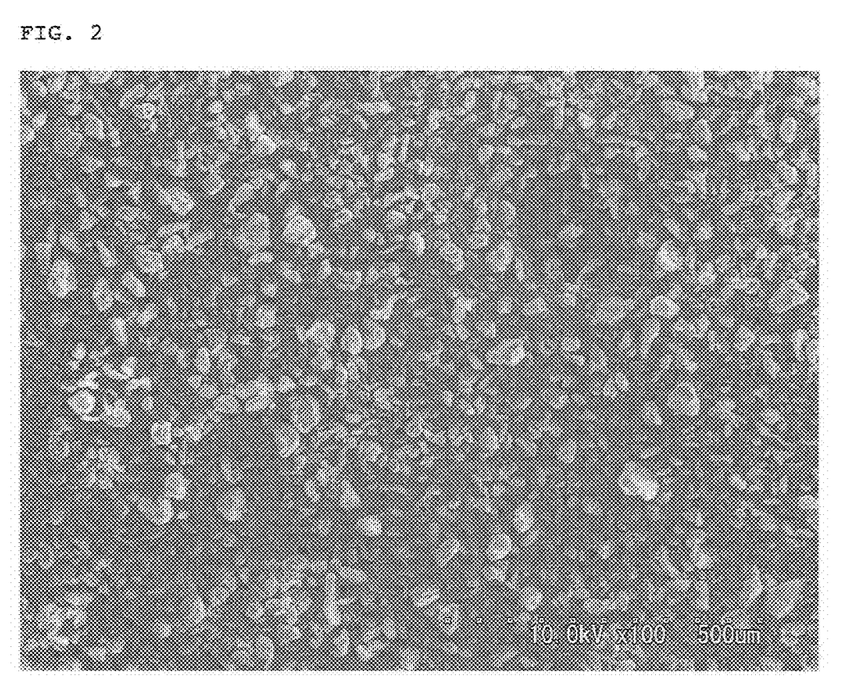
FIG. 2 is an SEM image of $H_3BO_3$ used in Example 1 (magnification: ×100).

The resulting $Mn_3O_4$ particles coated with aluminum hydroxide, lithium carbonate and boric acid having an average secondary particle diameter of 18.2 μm in which the boric acid was weighed such that the content of boron in the boric acid was 1.5 mol % based on manganese, were dry-mixed with each other for 1 hr such that a ratio of Li:Mn:Al was 1.072:1.828:0.10, thereby obtaining a uniform mixture. Thirty grams of the thus obtained mixture was placed in an alumina crucible, and held therein in atmospheric air at 910° C. for 3 hr, thereby obtaining lithium manganate particles. As a result of subjecting the resulting lithium manganate particles to X-ray diffraction analysis, it was confirmed that any peak owing to the boron and the boron compound added was not detected, and only lithium manganate having a single phase was present therein. An SEM image of the thus obtained lithium manganate particles and an SEM image of the boric acid used are shown in FIG. 1 and FIG. 2, respectively. As shown in FIG. 1, it was confirmed that the obtained lithium manganate particles had no angular edged portion and were in the form of rounded particles.

It was confirmed that the thus obtained lithium manganate particles had a composition: $Li_{1+x}Mn_{2-x-y}Y1_yO_4$ in which x is 0.072 and y is 0.10; the average primary particle diameter thereof was 4 μm; and the average particle diameter ($D_{50}$) of secondary particles thereof was 8.8 μm.

A 200 mL beaker was charged with 5 g of the thus obtained lithium manganate particles and 100 mL of pure water. The contents of the beaker were boiled for 7 min and then cooled, and further filtered through a filter paper No. 5B. The thus obtained filtrate solution was subjected to a solubility test to identify soluble constitutional elements of the particles by ICP. As a result, a whole amount of boron was dissolved in the solution. Therefore, it was confirmed that boron was present only on the surface of the respective lithium manganate particles. Further, since the amount of Li dissolved in the solution was proportional to the amount of boron dissolved therein, it was suggested that boron and Li form a compound thereof.

The coin cell produced by using a positive electrode active substance comprising the thus obtained lithium manganate particles had an initial discharge capacity of 108 mAh/g, and the specific capacity (3.3 V Foot) owing to the oxygen deficiency was 0.223 mAh/g. After the battery was subjected to 31 charge/discharge cycles at 60° C., it was confirmed that the capacity retention rate after the 31st cycle was 97%, and the rate characteristic thereof was 99.6%.

Examples 2, 3 and 5

The same procedure as defined in Example 1 was conducted except that the particle diameter of the boron compound used and the calcination temperature were variously changed, thereby obtaining lithium manganate particles. The production conditions used in these Examples are shown in Table 1, and various properties of the thus obtained lithium manganate particles are shown in Table 2.

Example 4

The same procedure as defined in Example 1 was conducted except that no Y1 element for coating the manganese oxide compound particles therewith was used, thereby obtaining lithium manganate particles. The production conditions used in Example 4 are shown in Table 1, and various properties of the thus obtained lithium manganate particles are shown in Table 2.

Comparative Example 1

Figure 3:
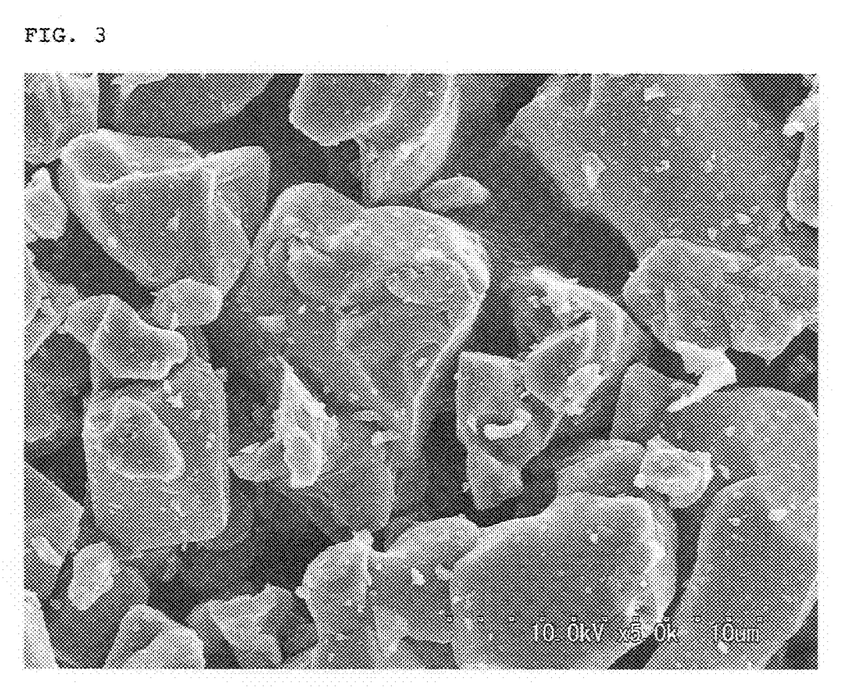
FIG. 3 is an SEM image of lithium manganate particles obtained in Comparative Example 1 (magnification: ×5000).
Figure 4:
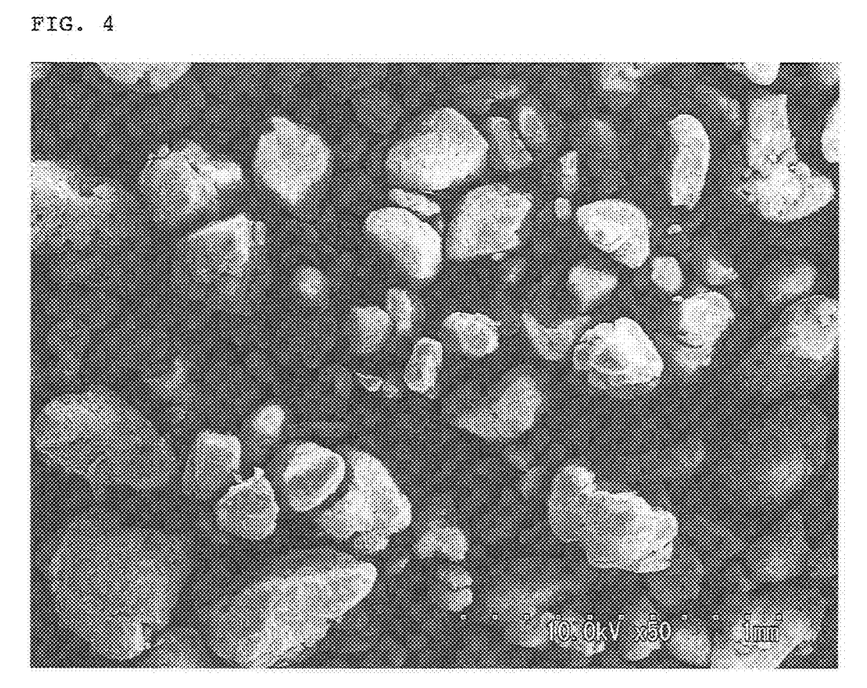
FIG. 4 is an SEM image of $H_3BO_3$ used in Comparative Example 1 (magnification: ×50).

The same procedure as defined in Example 1 was conducted except that $Mn_3O$, particles having an average secondary particle diameter of 4.8 μm which were coated with aluminum hydroxide and boric acid having an average particle diameter ($D_{50}$) of 193 μm were used, thereby obtaining lithium manganate particles. An SEM image of the thus obtained lithium manganate particles and an SEM image of the boric acid used are shown in FIG. 3 and FIG. 4, respectively. The production conditions used in Comparative Example 1 are shown in Table 1, and various properties of the thus obtained lithium manganate particles are shown in Table 2.

Comparative Example 2

The same procedure as defined in Example 1 was conducted except that the average particle diameters of the manganese compound and the boron compound used were variously changed, thereby obtaining lithium manganate particles. The production conditions used in Comparative Example 2 are shown in Table 1, and various properties of the thus obtained lithium manganate particles are shown in Table 2.

Comparative Example 3

The same procedure as defined in Comparative Example 2 was conducted except that the average particle diameters of the manganese compound and the boron compound used as well as the amount of Li mixed were variously changed, and no Y1 element for coating the manganese oxide compound particles therewith was used, thereby obtaining lithium manganate particles. The production conditions used in Comparative Example 3 are shown in Table 1, and various properties of the thus obtained lithium manganate particles are shown in Table 2.

From the above results, it was confirmed that the lithium manganate particles obtained in Comparative Example 1 suffered from generation of a large amount of fine particles as compared to those obtained in Example 1. Also, it was confirmed that the lithium manganate particles obtained in the respective Comparative Examples had a high specific capacity owing to oxygen deficiency. Therefore, it is considered that the lithium manganate particles obtained in these Comparative Examples suffered from the oxygen deficiency, so that elution of manganese therefrom was not suppressed, and the battery produced using the lithium manganate particles exhibited poor high-temperature characteristics and at the same time was deteriorated in rate characteristic.

TABLE 1

| Examples and Comparative Examples | Precursor | | | |
|---|---|---|---|---|
| | Kind of Mn compound (—) | Average secondary particle diameter (μm) | Different kind of metal element (—) | y (—) |
| Example 1 | $Mn_3O_4$ | 4.8 | Al | 0.10 |
| Example 2 | $Mn_3O_4$ | 13.2 | Al | 0.10 |
| Example 3 | $Mn_3O_4$ | 2.1 | Al | 0.10 |
| Example 4 | $Mn_3O_4$ | 4.4 | — | — |
| Example 5 | $Mn_3O_4$ | 6.8 | Al | 0.10 |
| Comparative Example 1 | $Mn_3O_4$ | 4.8 | Al | 0.10 |
| Comparative Example 2 | $Mn_3O_4$ | 12.6 | Al | 0.10 |
| Comparative Example 3 | $Mn_3O_4$ | 12.1 | — | — |

| Examples and Comparative Examples | Mixing | | |
|---|---|---|---|
| | Amount of Li x (—) | Additive compound (—) | Average particle diameter of B compound (μm) |
| Example 1 | 0.072 | $H_3BO_3$ | 18 |
| Example 2 | 0.072 | $H_3BO_3$ | 43 |
| Example 3 | 0.072 | $H_3BO_3$ | 11 |
| Example 4 | 0.104 | $H_3BO_3$ | 18 |
| Example 5 | 0.072 | $H_3BO_3$ | 82 |
| Comparative Example 1 | 0.072 | $H_3BO_3$ | 193 |
| Comparative Example 2 | 0.072 | $H_3BO_3$ | 193 |
| Comparative Example 3 | 0.104 | $H_3BO_3$ | 250 |

| Examples and Comparative Examples | Mixing | | Calcination conditions | |
|---|---|---|---|---|
| | Ratio of particle diameter of Mn compound to particle diameter of B compound | Amount of B compound added (mol %) | Temperature in air (° C.) | Time (hr) |
| Example 1 | 3.8 | 1.5 | 910 | 3 |
| Example 2 | 3.3 | 1.5 | 910 | 3 |
| Example 3 | 5.2 | 2.0 | 910 | 3 |
| Example 4 | 4.1 | 1.5 | 910 | 3 |
| Example 5 | 12.1 | 1.5 | 925 | 3 |
| Comparative Example 1 | 40.2 | 1.5 | 910 | 3 |
| Comparative Example 2 | 15.3 | 1.5 | 960 | 3 |
| Comparative Example 3 | 20.7 | 1.5 | 960 | 3 |

TABLE 2

| Examples and Comparative Examples | Properties of lithium manganate particles | |
|---|---|---|
| | Composition | Average primary particle diameter (μm) |
| Example 1 | $Li_{1.072}Mn_{1.828}Al_{0.1}O_4 + 0.0275B$ | 4 |
| Example 2 | $Li_{1.072}Mn_{1.828}Al_{0.1}O_4 + 0.0275B$ | 12 |
| Example 3 | $Li_{1.072}Mn_{1.828}Al_{0.1}O_4 + 0.0366B$ | 1.8 |
| Example 4 | $Li_{1.104}Mn_{1.896}O_4 + 0.0142B$ | 4 |
| Example 5 | $Li_{1.072}Mn_{1.828}Al_{0.1}O_4 + 0.0275B$ | 4.3 |
| Comparative Example 1 | $Li_{1.072}Mn_{1.828}Al_{0.1}O_4 + 0.0275B$ | 4 |
| Comparative Example 2 | $Li_{1.072}Mn_{1.828}Al_{0.1}O_4 + 0.0275B$ | 12 |
| Comparative Example 3 | $Li_{1.104}Mn_{1.896}O_4 + 0.0275B$ | 12 |

| Examples and Comparative Examples | Properties of lithium manganate particles | | | |
|---|---|---|---|---|
| | Average particle diameter | | | Breadth of particle size distribution |
| | $D_{50}$ (μm) | $D_{10}$ (μm) | $D_{90}$ (μm) | $(D_{90} - D_{10})$ (μm) |
| Example 1 | 8.8 | 5.5 | 11.8 | 6.3 |
| Example 2 | 13.5 | 3.2 | 21.2 | 18.0 |
| Example 3 | 4.2 | 2.4 | 7.1 | 4.7 |
| Example 4 | 12.3 | 5.4 | 22.3 | 16.9 |
| Example 5 | 16.7 | 4.1 | 29.1 | 25.0 |
| Comparative Example 1 | 15.2 | 3.8 | 38.1 | 34.3 |
| Comparative Example 2 | 24.3 | 14.2 | 54.3 | 40.1 |
| Comparative Example 3 | 26.7 | 17.2 | 58.7 | 41.5 |

| Examples and Comparative Examples | Output characteristics Capacity 0.1 C (mAh/g) | Oxygen deficiency Specific capacity (3.3 V Foot) (mAh/g) | High-temperature characteristics | |
|---|---|---|---|---|
| | | | 31Cy Eff. (%) | Rate characteristic Eff. (%) |
| Example 1 | 108 | 0.223 | 97 | 99.6 |
| Example 2 | 109 | 0.315 | 96 | 99.2 |
| Example 3 | 108 | 0.357 | 97 | 99.0 |
| Example 4 | 108 | 0.876 | 96 | 98.0 |
| Example 5 | 109 | 0.892 | 95 | 97.4 |
| Comparative Example 1 | 106 | 1.321 | 94 | 94.2 |
| Comparative Example 2 | 106 | 1.965 | 92 | 95.5 |
| Comparative Example 3 | 91 | 1.203 | 88 | 93.1 |

INDUSTRIAL APPLICABILITY

According to the process for producing lithium manganate particles according to the present invention, it is possible to produce lithium manganate having a high crystallinity which is suitable as a positive electrode active substance for a secondary battery exhibiting high output characteristics and excellent high-temperature storage characteristics. Therefore, the production process of the present invention is suitable as the process for producing lithium manganate particles.

The invention claimed is:
1. A process for producing lithium manganate particles comprising the steps in this order of:
mixing a lithium compound, a manganese compound and a boron compound with each other; and calcining the resulting mixture in a temperature range of 800 to 1050° C., in which an average particle diameter ($D_{50}$) of the boron compound is not more than 15 times an average particle diameter ($D_{50}$) of the manganese compound.

2. A process for producing lithium manganate particles according to claim 1, wherein the average particle diameter ($D_{50}$) of the boron compound is 1 μm to 100 μm.

3. A process for producing lithium manganate particles according to claim 1, wherein the average particle diameter ($D_{50}$) of the manganese compound is 1 μm to 20 μm.

4. A process for producing lithium manganate particles according to claim 1, wherein the lithium manganate particles as produced comprise secondary particles formed by aggregating or sintering primary particles of the lithium manganate particles having a particle diameter of not less than 1 μm, and have a composition represented by the following chemical formula:

$$Li_{1+x}Mn_{2-x-y}Y1_yO_4+B$$

where Y1 is at least one element selected from the group consisting of Ni, Co, Mg, Fe, Al, Cr and Ti, and x and y satisfy the conditions of 0.03≤x≤0.15 and 0≤y≤0.20, respectively; and wherein the secondary particles of the lithium manganate particles have an average particle diameter ($D_{50}$) of 1 μm to 20 μm, and a breadth of particle size distribution ($D_{90}$-$D_{10}$) of 2 μm to 30 μm.

* * * * *